United States Patent
Tanaka et al.

(10) Patent No.: US 6,682,693 B1
(45) Date of Patent: Jan. 27, 2004

(54) CARBON BASE MEMBER AND PROCESS FOR PRODUCING THE SAME

(75) Inventors: Yoshihiro Tanaka, Kiryu (JP); Mitsunari Ishizaki, Kiryu (JP); Motoaki Kuribara, Gunma-gun (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 10/196,233

(22) Filed: Jul. 17, 2002

(51) Int. Cl.[7] .................................................. B22F 1/00
(52) U.S. Cl. ............................. 419/11; 419/5; 419/53; 419/54; 419/55
(58) Field of Search .................. 419/5, 11, 53, 419/54, 55

(56) References Cited

U.S. PATENT DOCUMENTS 5,175,463 A    12/1992  Farago et al.
5,695,883 A  * 12/1997  Harada et al. ............... 428/408

FOREIGN PATENT DOCUMENTS

| JP | 0072312 | * | 10/1985 | ............. B60L/5/20 |
| JP | 0262566 | * | 9/1991 | |
| JP | A 8-308183 | | 11/1996 | |
| WO | WO 99/08367 | | 2/1999 | |

* cited by examiner

*Primary Examiner*—Daniel J. Jenkins
(74) *Attorney, Agent, or Firm*—Oliff & Berridge, PLC

(57) ABSTRACT

An inclined function material is formed with an iron layer on a surface of a carbon material. This material can be used in a carbon base member and does not limit the choice of desired characteristics in a carbon base member. The process by which the carbon base member is formed also ensures the iron layer is integrated firmly with the surface of the carbon material. A suitable amount of an iron powder having a particle diameter of 5 to 15 μm is placed directly on the surface of a carbon material, which is sintered in advance under suitable conditions, and stuck to the surface uniformly and flatly. The iron powder and the carbon material are sintered at 1000° C. to 1300° C. and preferably 1050 to 1150° C. for 1 to 2 hours and preferably about 1.5 hours to form a carbon base member in which the iron layer is formed on one surface of the carbon base member.

6 Claims, 3 Drawing Sheets

CARBON BASE MEMBER AND PROCESS FOR PRODUCING THE SAME

BACKGROUND OF THE INVENTION

1. Field of Invention

The invention relates to a carbon base member that may be used in components such as the commutator segments of commutators in electric motors and a process for producing the carbon base member.

2. Description of Related Art

In general, in an in-tank type fuel pump mounted on vehicles, the inside space of a housing constituting the fuel pump serves as a passage through which a fuel such as gasoline flows because the fuel pump itself is sunk (immersed) in the fuel. In such a system, it is necessary that the materials used to fabricate the fuel pump are formed using materials that are not damaged by the corrosive action of the fuel.

Recently, blended fuels containing a mixture of gasoline and alcohol or the like have become more widespread as a result of heightened interest in protecting the environment. However, it is known that the copper components fuel pumps for gasoline fuel can become corroded when used with these blended fuels. In particular, it is generally the commutator of a conventional electric motor, which is incorporated into a gasoline fuel pump, that is corroded by the alcohol.

U.S. Pat. No. 5,175,463 describes the structure of a typical commutator segment. Generally, a commutator segment is made of carbon at the portion with which a brush slidably contacts the commutator segment (carbon material) to minimize the corrosion caused by alcohol. The commutator segment is formed with a metal layer on the surface (one surface of the carbon material) opposite to the portion that slidably contacts the brush. A conductive terminal member (riser bar) made of copper is integrated (electrical connection) with the metal layer. However, the carbon material is known to have poor surface wettability and is therefore difficult to bind with almost all metals. In order to bind the conductive terminal member with the surface of the carbon material, it is necessary to form a metal layer between them. For this, according to the aforementioned patent, the surface of the carbon material is plated using nickel or the like and the conductive terminal member is bound to the plated surface by means of, for example, soldering. In this case, the metal layer formed by plating can be easily peeled off. Thus, even if integrated bonding between the metal layer and the conductive terminal member could be accomplished, the possibility that the plated metal layer, together with the conductive terminal member, may peel from the surface of the carbon material. The strength of adhesion between the metal layer and the carbon material may be insufficient for a suitable commutator and results in inferior durability.

In addition, JP-A-8-308183 shows a structure with a carbon base member, to which a conductive terminal member has been bound in advance, that is formed by unitedly sintering a carbon powder, a metal powder arranged layer-like to the carbon powder and the conductive terminal member arranged on the metal powder side.

However, because this is a configuration in which a carbon powder, a metal powder and a conductive terminal member are sintered integrally, the sintering process is complicated and poses many difficulties. For example, the sintering temperature must be carefully selected to be a temperature that is of the order at which the conductive terminal member made of copper is not deformed and lower than the melting point of the metal powder. This severely limits the range of temperatures that may be used to sinter the carbon material. Furthermore, when sintering these different materials together, the differences in the sintering shrinkage percentage between the metal powder and the carbon powder can lead to the formation of a clearance between them very easily. There is, therefore, a fear that the sintered metal and carbon layers may peel from each other. In order to prevent this, it is necessary to select a carbon material that has a sintering shrinkage percentage that is similar to that of the metal powder. However, this solution to prevent peeling then limits types of carbon material that may be selected, which excludes the use of certain carbon materials having the desired characteristics for a particular application. The problem to be solved by the present invention consists in this point.

SUMMARY OF THE INVENTION

In view of the above problems, the invention has been made for the purpose of solving these problems. In one embodiment, the invention provides a carbon base member comprising an iron layer formed on the surface thereof and bondable with a metal material. The carbon base member is formed by sticking an iron powder to a carbon material formed in advance by sintering, and by sintering the resulting product at a temperature higher than the diffusion temperature of carbon and lower than the melting point of iron. According to the invention, an inclined function material can be made in which the metal layer is securely formed on the surface of the carbon material unitedly.

Further, the invention provides a process for producing a carbon base member comprising an iron layer formed on the surface thereof and bondable with a metal material. The process comprises sticking an iron powder to a carbon material formed in advance by sintering, and thereafter sintering the resulting product at a temperature higher than the diffusion temperature of carbon and lower than the melting point of iron.

According to this process, the sintering temperature of the carbon material can be designed arbitrarily, so that the characteristics of the carbon base member can be selected in a free manner.

In the invention, an appropriate sintering temperature may be designed to be 1000 to 1300° C.

Further, in the invention, the iron powder may be fine particles having an average particle diameter of 10 $\mu$m or less.

Also, in the invention, the carbon base member may be used as a commutator segment constituting an electric motor.

Moreover, in the invention, the surface of the carbon base member may be provided with a conductive terminal member bonded therewith.

DETAILED DESCRIPTION OF PREFERRED EMBODIMENTS

It is generally known that when iron with a small carbon content is heated at a temperature of about 800° C. or more, which exceeds the solid-solution temperature of carbon in a carbon atmosphere, a so-called "carburization" reaction in which carbon is diffused to the surface of an iron material takes place. This gradually increases the content of carbon. It is also known that iron or an iron-base material in which carbon is dissolved in the form of a solid solution has a lower melting point. Generally, the melting point decreases as carbon content increases. Furthermore, it is also known that the iron or iron-base materials melted by the above carburizing reaction are highly reactive.

From the fact as mentioned above, it is assumed that a solid solution corresponding to a carburizing reaction is produced on the carbon base member to form an iron layer by heating to a temperature above the solid solution temperature of carbon when an iron powder is placed on the surface of the carbon material, which has been sintered in advance, and the foregoing formation process has been invented on this assumption.

Figure 1:
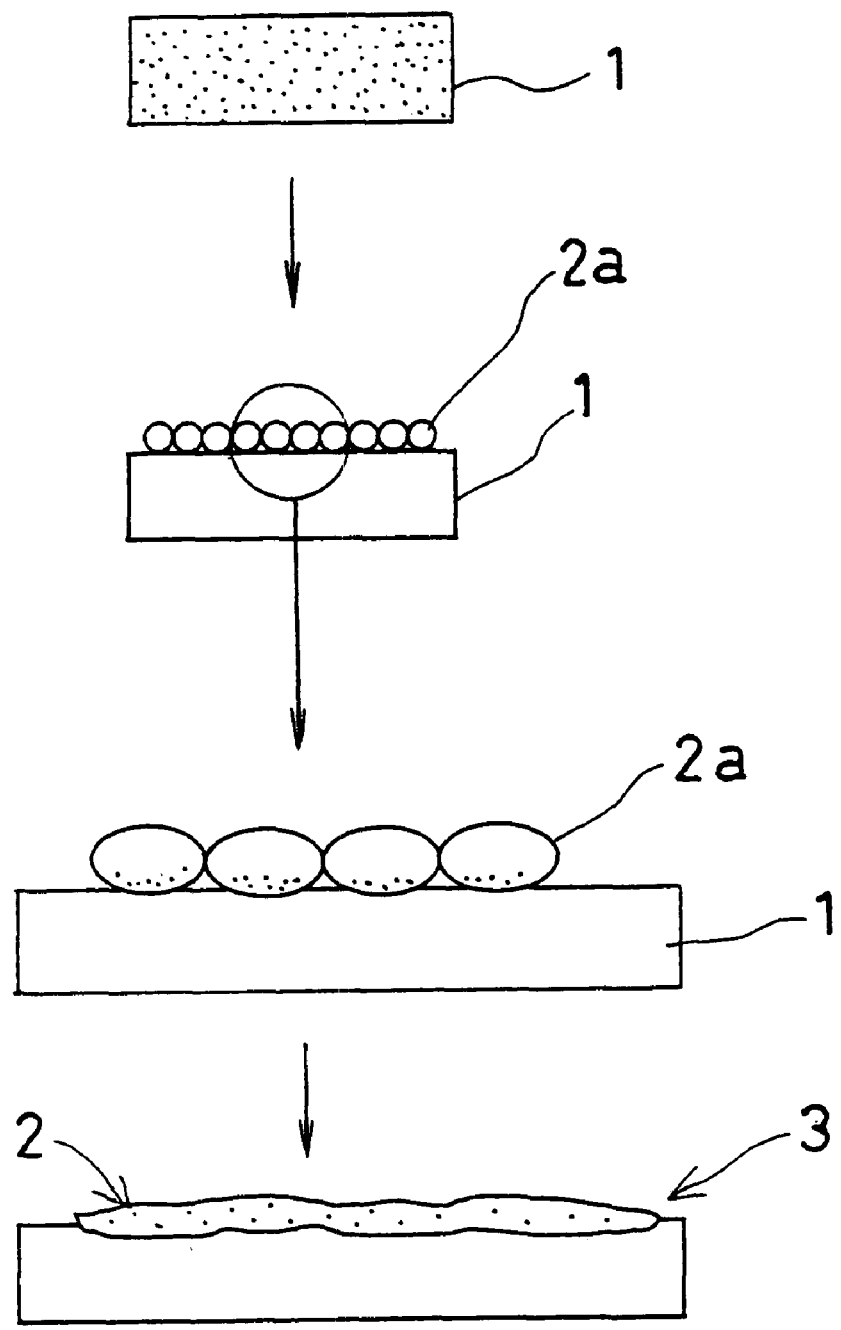
FIG. 1 is a sectional view for explaining a process for forming a carbon base member.

FIG. 1 shows a schematic view of the process for forming a carbon base member according to the present invention.

The carbon material 1 is first prepared in advance. Namely the carbon material 1 is sintered, for example, by pressing or molding a carbon powder into a desired form (e.g., ring form), at 800 to 2000° C. for 2 hours and cooling the resulting product to normal temperature (ambient temperature). The conditions under which the carbon material 1 is formed, such as the sintering temperature and sintering time, may be determined properly according to the use of the carbon material.

An iron powder 2a is stuck to the upper surface (front surface) of the carbon material 1 formed as described above. There are various methods taken to accomplish this, such as a method in which the iron powder 2a is directly placed in a proper amount on the upper surface of the carbon material 1 and is flattened with a spatula or the like. Also, the iron powder 2a may be forcibly stuck to the surface of the carbon material 1 by using a binder (e.g., an organic adhesive) that is, for instance, burned off in the heating stage during sintering so that it does not remain. In addition, the particle diameter of the iron powder 2a to be used is about 5 to 15 $\mu$m and the average particle diameter is preferably 10 $\mu$m.

The sintering temperature in this case is higher than the diffusion temperature of carbon (higher than diffusion temperature) and lower than the melting point of iron (lower than melting point), specifically 1000 to 1300° C. and preferably 1050 to 1150° C. The sintering time is 1 to 2 hours and preferably about 1.5 hours. As to the sintering atmosphere, the operation is preferably performed under a vacuum atmosphere. However, a vacuum atmosphere is not required in the present invention. These operational conditions enables the formation of a carbon base member 3 provided with an iron layer 2 formed on the surface thereof and the carbon base member 3 may be used in various uses as a so-called inclined function material.

A mechanism of forming the iron layer 2 integrally on the surface of the carbon material 1 is assumed as follows. Specifically, in the aforementioned FIG. 1, the iron powder 2a is placed uniformly on the surface of the carbon material 1 sintered in advance (FIG. 1 (A)). When the carbon material 1 is heated to raise the temperature to above the diffusion temperature (about 800° C.) of carbon and lower than the melting point (1540° C.) of iron, the carbon diffuses and enters gaps present in the lattice point between iron atoms (Fe atoms). This causes a carburizing reaction which promotes the solid solution of carbon in iron (FIG. 1(B)). Along with the progress of this solid solution and hence an increase in the amount of the solid solution of carbon, the melting point of the solid solution falls, whereby the above solid solution produced at the contact portion between the carbon material 1 and the iron powder 2a melts. This melted solid solution flows into fine porous surfaces formed on the surface of the carbon material 1 and firmly adheres to the porous surface (FIG. 1(C)). By an anchor effect produced by the adhesion, it is assumed that an inclined function material put in the condition that the iron layer 2 is firmly integrated with the surface of the carbon material 1 is made.

When forming the carbon base member 3 provided with the iron layer 2 on the surface thereof in this manner, generally the carbon material 1 may be sintered in advance. Therefore, to state various conditions under which the carbon material 1 is sintered, the carbon material 1 may be processed by sintering in the condition so considered as to allow the carbon material 1 to be made into a product having characteristics according to a purpose of use. Unlike conventional carbon base members which are produced by sintering a carbon powder, a metal powder and a conductive terminal member simultaneously, it is unnecessary to adapt sintering conditions to materials other than the carbon material 1. Thus, the claimed method imparts such an advantage that sintering conditions (e.g., temperature and pressure) and material properties of the carbon material 1 may be freely selected, depending on the desired characteristics of the carbon material 1.

Experimental examples will be shown below.

EXPERIMENTAL EXAMPLE

Figure 2:
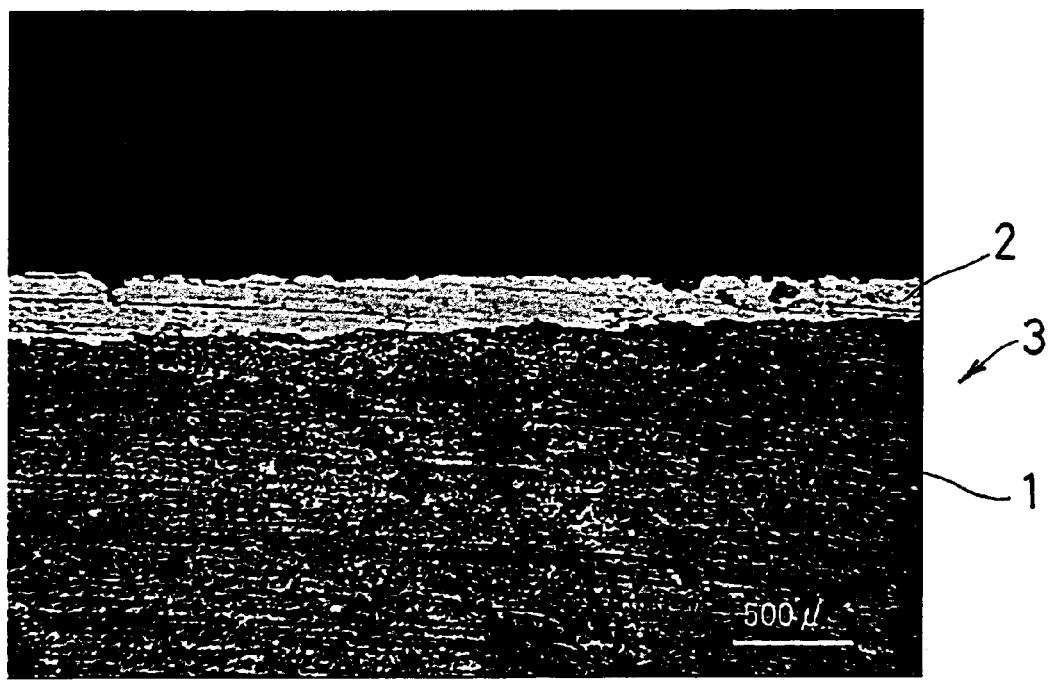
FIG. 2 is a microphotograph of a carbon base member.

An iron powder having a particle diameter of 10 $\mu$m was placed on the surface of a carbon material, which had been sintered in advance at 1400° C. for 2 hours, in a layer having a uniform thickness of about 0.5 mm. The iron powder and carbon material were then sintered at about 1100° C. in a vacuum atmosphere for 1.5 hours to obtain a carbon base member. An electron microphotograph of this carbon base member is shown in FIG. 2. The thickness of the iron layer was about 200 $\mu$m in average. A separate analysis of the carbon base member confirmed that the iron layer was carburized.

Figure 3:
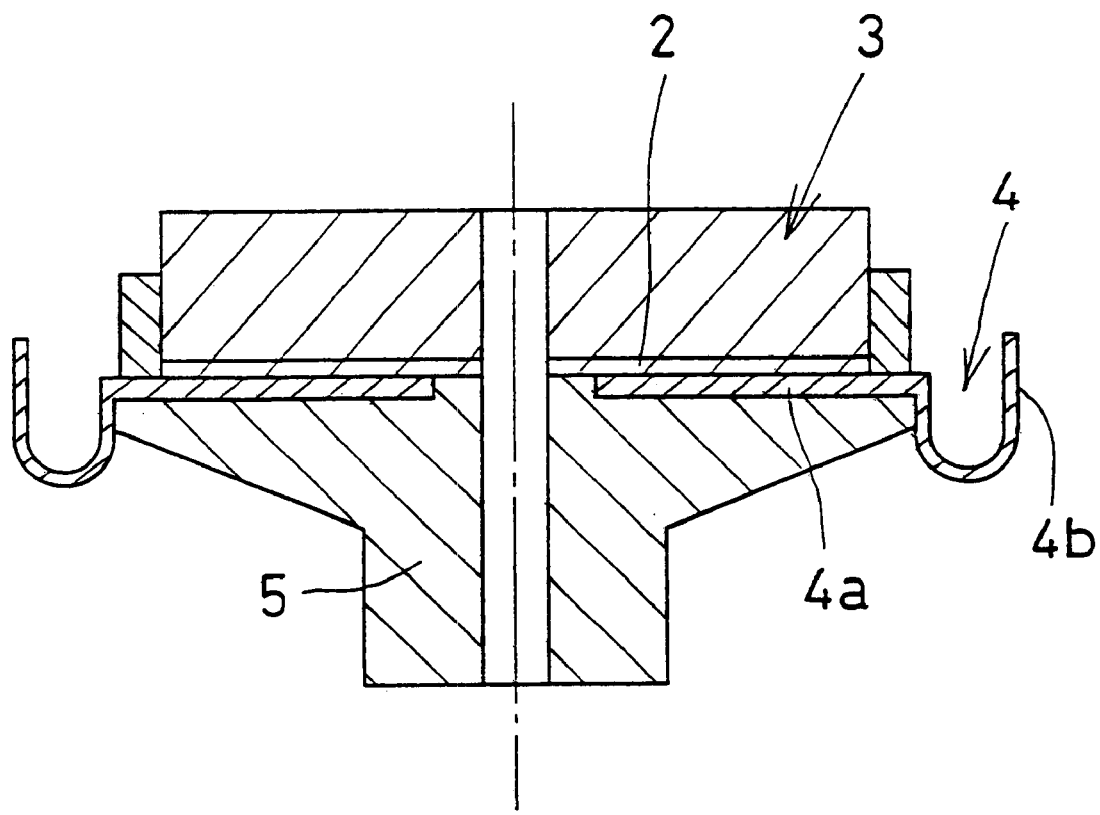
FIG. 3 is a sectional view of a commutator.

The surface of the iron layer of the carbon base member formed in this manner is thicker than that of a plated layer and is enough to solder a metal such as copper. Then, using the carbon base member, a commutator segment, which is a constituent of a commutator of a fuel pump disposed in a fuel tank containing alcohols, was actually formed. This segment was, as shown in FIG. 3, formed in a manner that the inside diameter side portions 4a of plural risers 4 (conductive terminal members according to the present invention) were bound radially with the iron layer 2 of the carbon base member 3 in advance by means of soldering or the like. In this segment, it was confirmed that the joining of the riser 4 with the iron layer 2 was made firmly and the segment attained a function as a commutator sufficiently. In this case, examples of suitable bonding means include, but are not limited to, means such as brazing, fitting and adhering in addition to soldering.

It is to be noted that the commutator has a structure in which the U-riser bars 4b are formed projecting from the outer peripheral side and a boss portion 5 is formed by molding an insulating resin material in the condition that the riser 4 is bound with the carbon base member 3.

What is claimed is:
1. A process for producing a carbon base member having an iron layer formed on a surface of the carbon base member, wherein the iron layer is bondable with a metal material, the process comprising:

a first sintering of a carbon material;

sticking an iron powder to a surface of the sintered carbon material; and a second sintering of the iron powder and the sintered carbon material at a temperature higher than the diffusion temperature of carbon and lower than the melting point of iron.

2. The process for producing a carbon base member according to claim 1, wherein the temperature of the second sintering is 1000 to 1300° C.

3. The process for producing a carbon base member according to claim 1, wherein the iron powder is fine particles having an average particle diameter of 10 μm or less.

4. The process for producing a carbon base member according to claim 1, wherein the carbon base member is used as a commutator segment constituting an electric motor and the commutator segment is obtained by binding a conductive terminal member with the surface of the carbon base member.

5. The process for producing a carbon base member according to claim 2, wherein the carbon base member is used as a commutator segment constituting an electric motor and the commutator segment is obtained by binding a conductive terminal member with the surface of the carbon base member.

6. The process for producing a carbon base member according to claim 3, wherein the carbon base member is used as a commutator segment constituting an electric motor and the commutator segment is obtained by binding a conductive terminal member with the surface of the carbon base member.

* * * * *